(12) United States Patent
Gehrke et al.

(10) Patent No.: US 8,502,072 B2
(45) Date of Patent: Aug. 6, 2013

(54) SPLICED CABLE WITH OVERMOLDED WATER PROOF COATING AND METHOD FOR MAKING THE SAME

(75) Inventors: Frederick Paul Gehrke, Greensboro, NC (US); Dennis Paul Dyer, Greensboro, NC (US); James Ronald Baughan, Gibsonville, NC (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 414 days.

(21) Appl. No.: 12/801,242

(22) Filed: May 28, 2010

(65) Prior Publication Data
US 2010/0307815 A1    Dec. 9, 2010

Related U.S. Application Data

(60) Provisional application No. 61/213,332, filed on May 29, 2009.

(51) Int. Cl.
*H02G 15/02* (2006.01)

(52) U.S. Cl.
USPC .................................. 174/74 R; 174/77 R (58) Field of Classification Search
USPC .............. 174/110 R, 110 SR, 110 N, 110 FC, 174/120 R, 120 C
See application file for complete search history.

(56) References Cited

U.S. PATENT DOCUMENTS

| | | | |
|---|---|---|---|
| 3,809,802 A * | 5/1974 | Pearson | 174/103 |
| 4,826,726 A * | 5/1989 | Maeda et al. | 428/379 |
| 6,125,534 A * | 10/2000 | Varreng | 29/869 |
| 6,872,890 B2 * | 3/2005 | Goehlich et al. | 174/74 R |

FOREIGN PATENT DOCUMENTS
JP    2001-229740 A  *  8/2001

* cited by examiner

*Primary Examiner* — William H Mayo, III
(74) *Attorney, Agent, or Firm* — Ingrassia Fisher & Lorenz, P.C.

(57) ABSTRACT

A cable includes an outer jacket of polyethylene surrounding a plurality of conductive wires. Each one of the plurality of insulated conductive wires comprises a conductive core and an insulating layer surrounding the conductive core, the insulating layer being made of cross-linked polyethylene.

6 Claims, 8 Drawing Sheets

SPLICED CABLE WITH OVERMOLDED WATER PROOF COATING AND METHOD FOR MAKING THE SAME

CROSS REFERENCE TO RELATED APPLICATIONS

The instant application claims priority to U.S. Provisional Application 61/213,332 filed on May 29, 2009, entitled "Spliced Cable with Overmolded Water Proof Coating and Method for Making the Same," the disclosure of which is expressly incorporated by reference herein in its entirety.

BACKGROUND OF THE INVENTION

1. Field of the Invention

The present invention relates to a cable with a spliced section covered in a protective material. More specifically, the present invention relates to a data cable configured for use in high pressure underwater environments in which a splice is made in the cable, and an overmold is formed over the splice to form a water-tight seal.

2. Discussion of Background Information

Figures 1A, 1B:
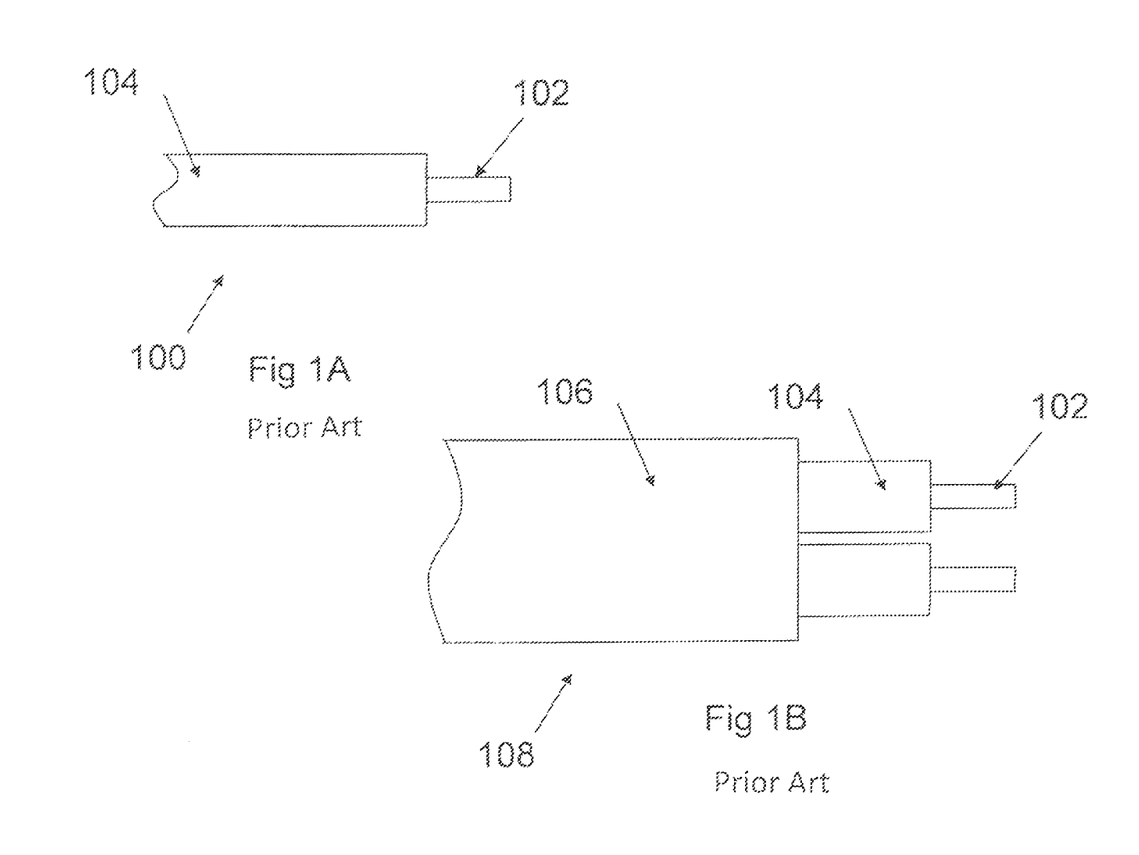
FIGS. 1A and 1B show a prior art wire configuration.

Wires and cables are used to carry data from one point to another. Referring now to FIGS. 1A and 1B, a wire 100 is typically made from an inner conductor 102 such as uniform or wound strands of copper, with an over molded insulating layer 104. Several wires 100 are typically wound together (e.g., twisted pair), and then covered by an outer jacket 106 (often referred to as a "belt") to form a cable 108. Outer jacket 106 and insulating layer 104 are typically removed at the ends of these cables 108 so that the conductors 102 can be exposed and connected to other electronic elements.

The nature of the number and arrangement of wires 100 restricts the selection of materials that can be used for the insulating layer 104. For example, for a single wire 100 as shown in FIG. 1A, which lacks an outer jacket 106, insulating layer 104 could be made of polyethylene. However, when multiple wires 100 are used to form the cable 108, polyethylene cannot be used because it would melt during application of the outer jacket 106; the individual wires 100 would become a multi-wire suspension within a solid mass, making it impossible to splice the wires at the end. For these reasons, insulating layer 104 is typically made from a Teflon-based material.

Often cables such as shown in FIG. 1B need to be spliced and placed in high pressure underwater environments. Typical efforts involve the application of some type of material(s) around the exposed cables to form a seal, such as polyethylene. However, the Teflon in insulating layer 104 has poor bonding qualities, and therefore will not form a strong bond with the applied sealants. Under extreme pressure, the water will break the seal, reach the underlying exposed wires, and flow back up the wire pathways to upstream and downstream elements.

Cross-linked polyethylene has been used as an outer insulating layer in high voltage power cables due to its high dielectric constant and resistance to stress cracking. Such high voltage power cable wires are usually encased in an outer jacket made of rubber.

SUMMARY OF THE INVENTION

According to an embodiment of the invention, a cable is provided. The cable includes an outer jacket of polyethylene surrounding a plurality of conductive wires. Each one of the plurality of insulated conductive wires comprises a conductive core and an insulating layer surrounding the conductive core, the insulating layer being made of cross-linked polyethylene.

The above embodiment may have various features. There may be an intermediate substance between the insulating layer of each one of the plurality of insulated conductive wires and the outer jacket. The intermediate substance may be a nylon sheath or a spray-on slip agent. The degree of cross-linking within the cross-linked polyethylene may be 50-90%, or 60-70%.

According to another embodiment of the invention, a cable connection assembly is provided. The assembly includes a plurality of insulated conductive wires, each individual wire of the plurality of conductive wires being covered by an insulating layer made of cross-linked polyethylene. An outer jacket of polyethylene surrounds the plurality of conductive wires. A circuit element is electrically connected to exposed portions of the plurality of conductive wires. An enclosure covers at least the exposed portions of the plurality of conductive wires, adjacent portions of the outer jacket, and the electronic element. The enclosure is a homogenous substance comprising polyethylene fusion bonded with the cross-linked polyethylene of the insulating layer. The enclosure is configured to prevent fluid from entering if fluid is present under pressure between the outer jacket and the plurality of insulated conductive wires.

The above embodiment may have various features. There may be an intermediate substance between the insulating layer of each one of the plurality of insulated conductive wires and the outer jacket. The intermediate substance may be a nylon sheath or a spray-on slip agent. The degree of cross-linking within the cross-linked polyethylene may be 50-90%, or 60-70%.

According to another embodiment of the invention, a method for connecting a cable to an electronic component. A cable is provided that includes at least one insulated conductive wire, each wire being covered by an insulating layer made of cross-linked polyethylene; and an outer jacket of a first polyethylene surrounding the at least one insulated conductive wire. The method further includes exposing the at least one insulated conductive wire, connecting the exposed portion of the at least one insulated wire with the electronic component; introducing a second polyethylene in an area, the area surrounding the exposed portion of the at least one insulated wire, an adjacent portion of the outer jacket and the electronic component; and fusion bonding the cross-linked polyethylene in the insulating layer to any contacting portion of the first polyethylene in the adjacent portion of the outer jacket and/or the introduced second polyethylene, thereby forming a solid mass around the area. The solid mass is configured to prevent fluid from reaching the area if fluid is present under pressure between the outer jacket and the at least one insulated conductive wires.

The above embodiment may have various features. The method may further include placing said area in a mold, injecting the second polyethylene into a cavity within the mold to surround the area. The method may further include preheating a mold to a predetermined first temperature, placing said area in a cavity of the mold, injecting the second polyethylene into the area, and cooling the second polyethylene to a second predetermined temperature. Because of said cooling, free-end components of the cross-linked polyethylene in the insulating layer may intertwine with the first polyethylene in the outer jacket and the injected second polyethylene, forming a homogenous mixture via a fusion bond. The first and second temperature may allow the cross-linked polyethylene in the insulating layer to fusion bond with the first polyethylene in the outer jacket and the injected second polyethylene. Injecting the second polyethylene into the preheat mold may increases the temperature of the injected second polyethylene to approximately the first temperature. The cooling may comprises reducing the temperature of the polyethylene from the first temperature to the second temperature at a predetermined rate of cooling. The first temperature is approximately 295 degrees F., the second temperature is approximately 150 degrees F., and the rate of cooling is approximately 7 degrees per minute.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
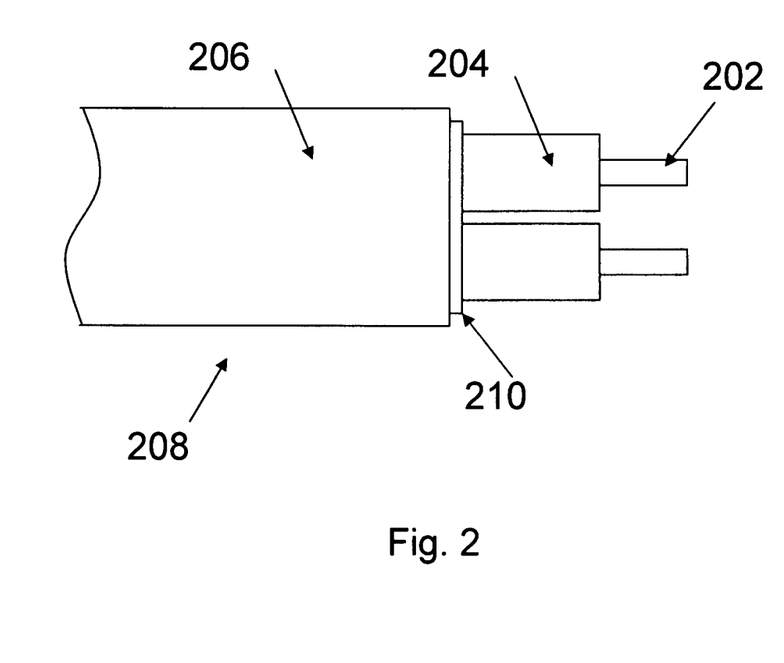
FIG. 2 shows a wire according to an embodiment of the invention.

Referring now to FIG. 2, an embodiment of the invention is shown. A cable 208 includes a plurality of conductive wires 202. Each wire 202 is individually covered by an insulating layer 204, and the group of wires 200 is covered by an outer jacket 206. The insulating layers 204 are made of cross-linked polyethylene. The outer jacket 206 is standard polyethylene. An intermediate substance 210, such as a nylon sheath or a spray-on slip agent, may be placed between the insulating layers 204 and the outer jacket 206. Mercury Wire part number, Slipper 1, Gem Gravure part number 5150CL, is an example of an appropriate slip agent for this purpose.

Several methods can be used to produce cross linked polyethylene from polyethylene for use as insulating layer 204. Polyethylene can be exposed to an electron beam or treated with a cross-linking agent, such as a peroxide (e.g., dicumyl peroxide), silane, or vinylsilane. The degree of cross linking (or gel content) can vary from less than 10% to greater than 90%. Under some conditions the degree of cross linking can approach 100%. In electrical insulation applications, the degree of cross linking is commonly in the range of 50%-90%, for example 50%-60%, 60%-80%, 60%-70%, 70%-80%, or 80%-90%.

In the embodiments herein, the degree of cross linking is preferably in the 60-70% range, and particularly about 65%, although other amounts can be used. A non-limiting example is the PolyOne Syncure™ System S107FH comprised of a Grafted Base resin of S-1054A (66.7%) and a catalyst master batch V-0045G (33.3%) material. However, the invention is not limited to any specific type of cross-linked polyethylene or method of manufacture thereof.

The degree of cross linking can be measured by weighing a sample before and after extraction of non-cross-linked material in a hot solvent (e.g., xylene at 120 degrees C.). See, for example, ASTM Standard D2765-01, 2006, "Standard Test Methods for Determination of Gel Content and Swell Ratio of Crosslinked Ethylene Plastics," which is incorporated by reference in its entirety. See also ASTM Standard D470-05, 2005, "Standard Test Methods for Crosslinked Insulations and Jackets for Wire and Cable"; ASTM Standard D2655-00, 2006, "Standard Specification for Crosslinked Polyethylene Insulation for Wire and Cable Rated 0 to 2000 V"; and ASTM Standard D2656-00, 2006, "Standard Specification for Crosslinked Polyethylene Insulation for Wire and Cable Rated 2001 to 35,000 V," each of which is incorporated by reference in its entirety.

As discussed above, polyethylene is not a preferred material for insulating layer 204 because of its tendency to melt during the application of outer jacket 206. In contrast, cross linked polyethylene does not melt in the conventional sense. Once the crystalline melt point is exceeded, cross linked polyethylene changes from a ductile semi-crystalline solid to a non-crystalline elastomer. Thus, the different insulating layers 204 of the individual wires 202 will (for the most part) not melt into a massive inseparable homogenous mass, such that the wires 202 can be still be individually separated and spliced. Also, the temperature used to mold the outer jacket 204 is not high enough to cause any significant interaction with the underlying cross-linked polyethylene, and any such interaction can be largely avoided by the intermediate substance(s) 210 discussed above.

Figure 3:
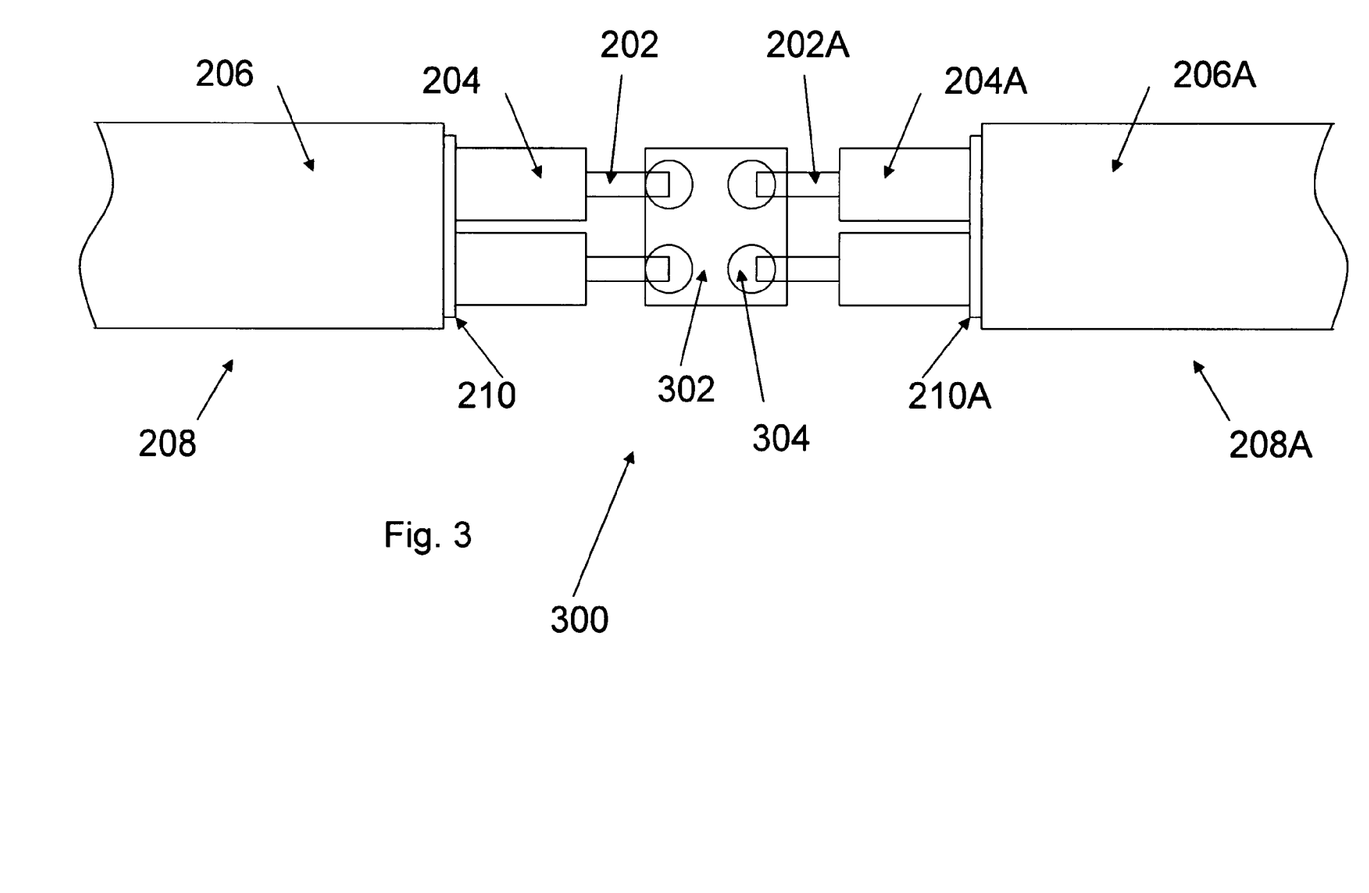
FIG. 3 shows two wires connecting an intermediate electronic element according to an embodiment of the invention.

Referring now to FIG. 3, an assembly 300 is shown. The cable 208 is connected at the exposed wires 202 to an electronic element 302 by soldering or other connection methodology. For reference, the opposite end of the electronic element is connected to a similar cable 208A and wires 202A, although the invention is not limited to any such second connection or configuration. Electronic element 302 is preferably a printed wiring board with connectors 304 to facilitate connection between the spliced ends of cables 208 and 208A, although the invention is not so limited, and any type of electronic element 302 could be used.

Figure 4A:
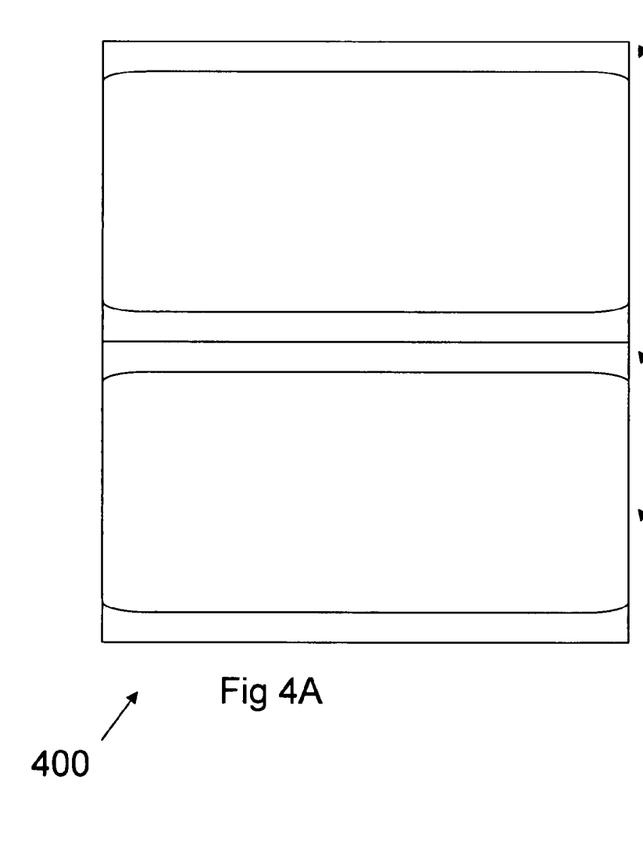
FIGS. 4A-4C shows a mold for enclosing the components shown in FIG. 3.
Figures 4B, 4C:
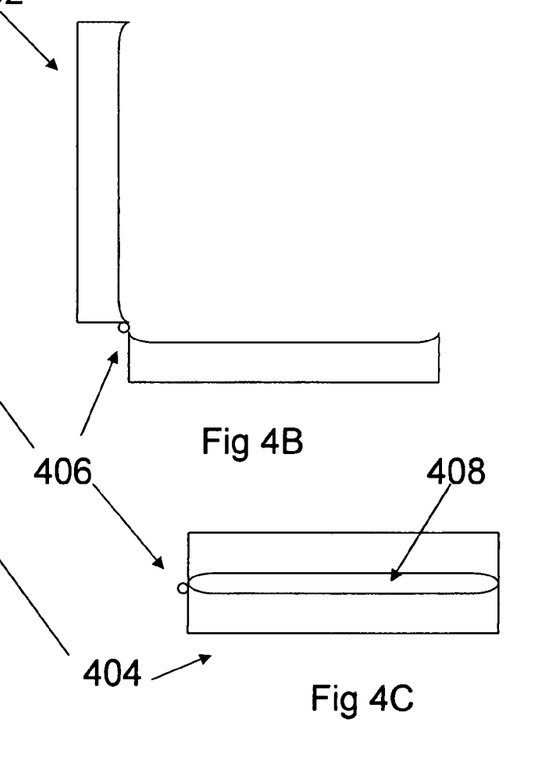

Referring now to FIGS. 4A-4C, to provide ocean capability, the entire assembly 300 shown in FIG. 3 must be water sealed. The seal is created by placing the assembly in a mold 400. Mold 400 can include a clam shell configuration, with a top portion 402, a bottom portion 404, and a hinge of flex point 406, or the mold can consist of two pieces. The mold has a partially hollowed out interior to define a cavity 408.

Mold 400 is pre-heated to a first temperature, at which time assembly 300 is enclosed therein. Polyethylene is then injected into cavity 408 of mold 400. The polyethylene then cools gradually to a second temperature, preferably at a substantially predetermined rate. The first temperature, the second temperature, and the rate of cooling is largely based on two factors: (1) creation of the fusion bond (discussed below) and (2) the dimensions of cavity 408 (due to the amount of injected polyethylene in mold 400).

Figure 5A:
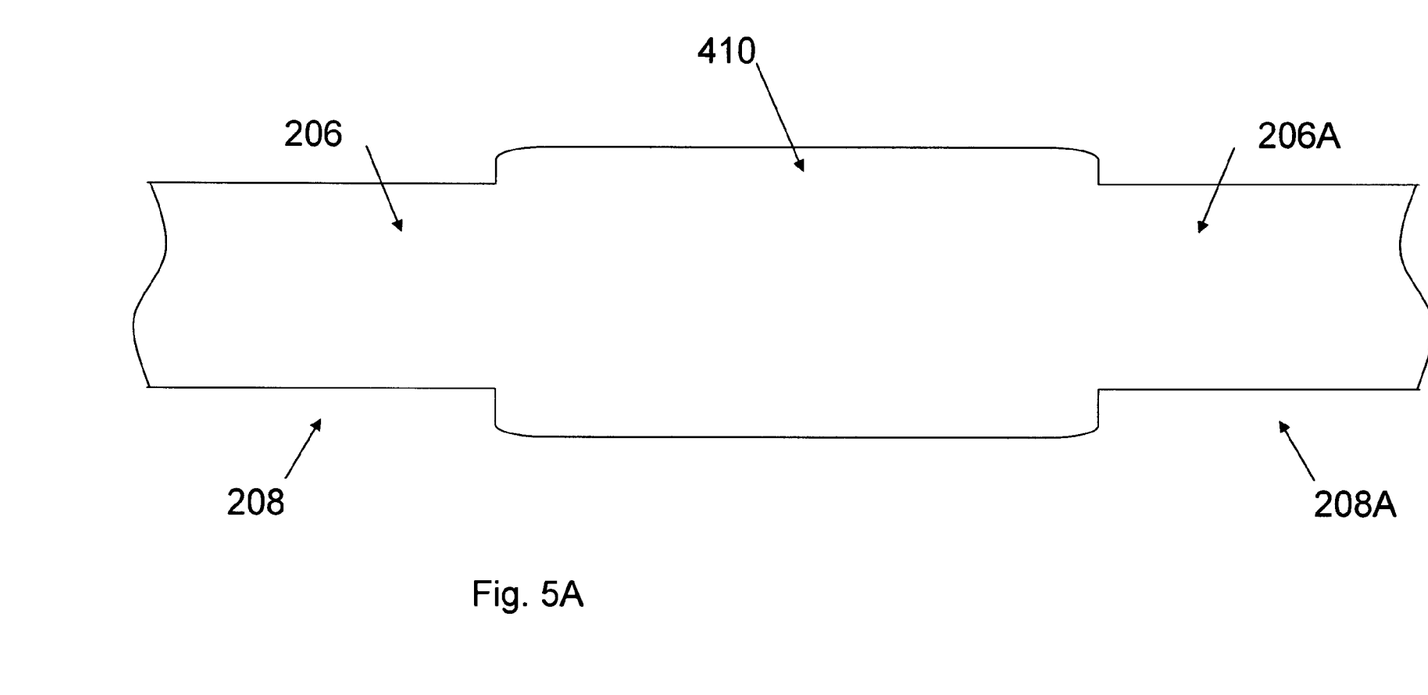
FIGS. 5A and 5B shows external and internal views of the components shown in FIG. 3 after enclosure in a solid mass.
Figure 5B:
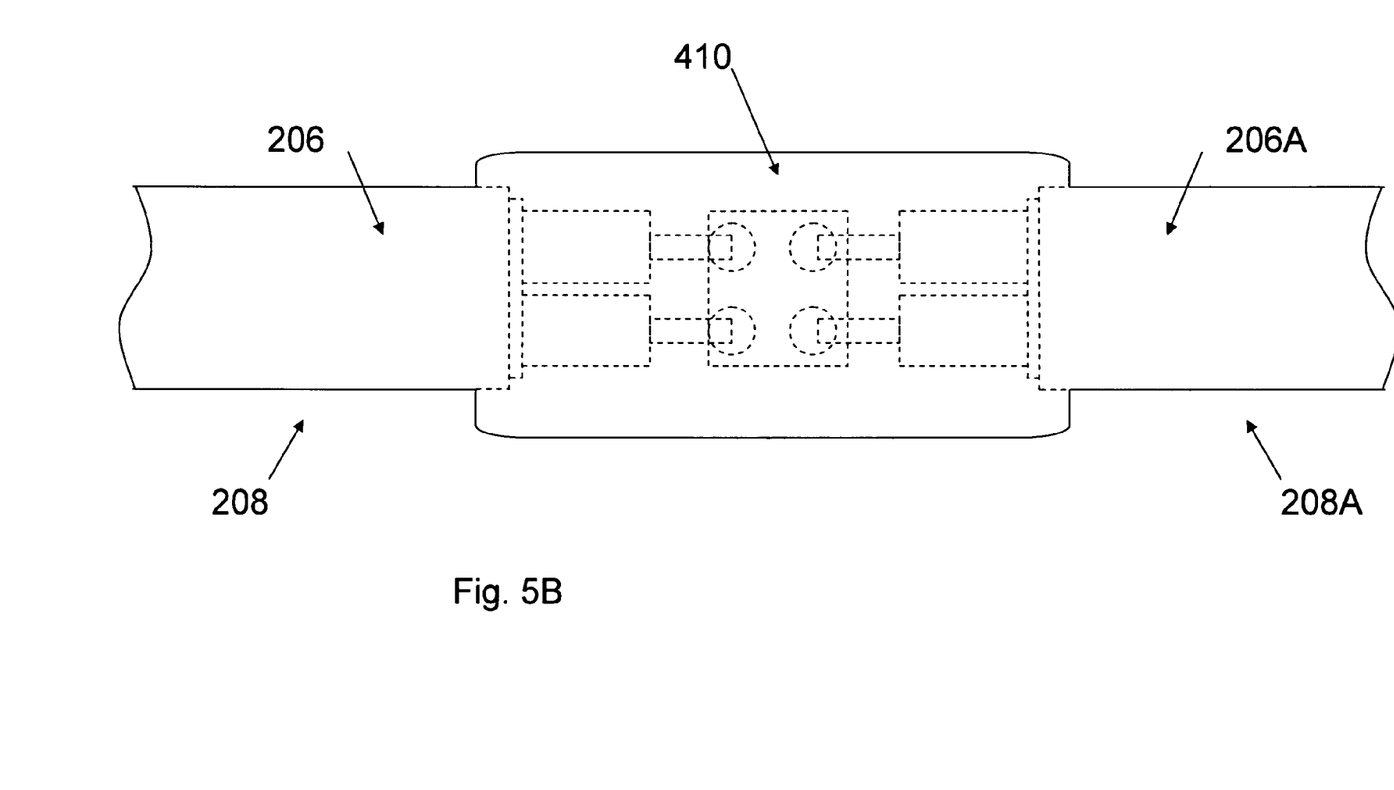

During the above process, the free ends components of the cross-linked polyethylene in insulating layer 204 intertwine with the polyethylene in the outer jacket 206 and the injected polyethylene, forming a homogenous mixture via a fusion bond. When the mold cools, the homogenous mixture forms a solid mass 410. The resulting solid mass 410 will have the shape of the cavity 408 within mold 400, and completely encloses and seals assembly 300 as shown in FIG. 5A. FIG. 5B shows the components of assembly 300 in phantom lines as encased within solid mass 410.

Figure 6:
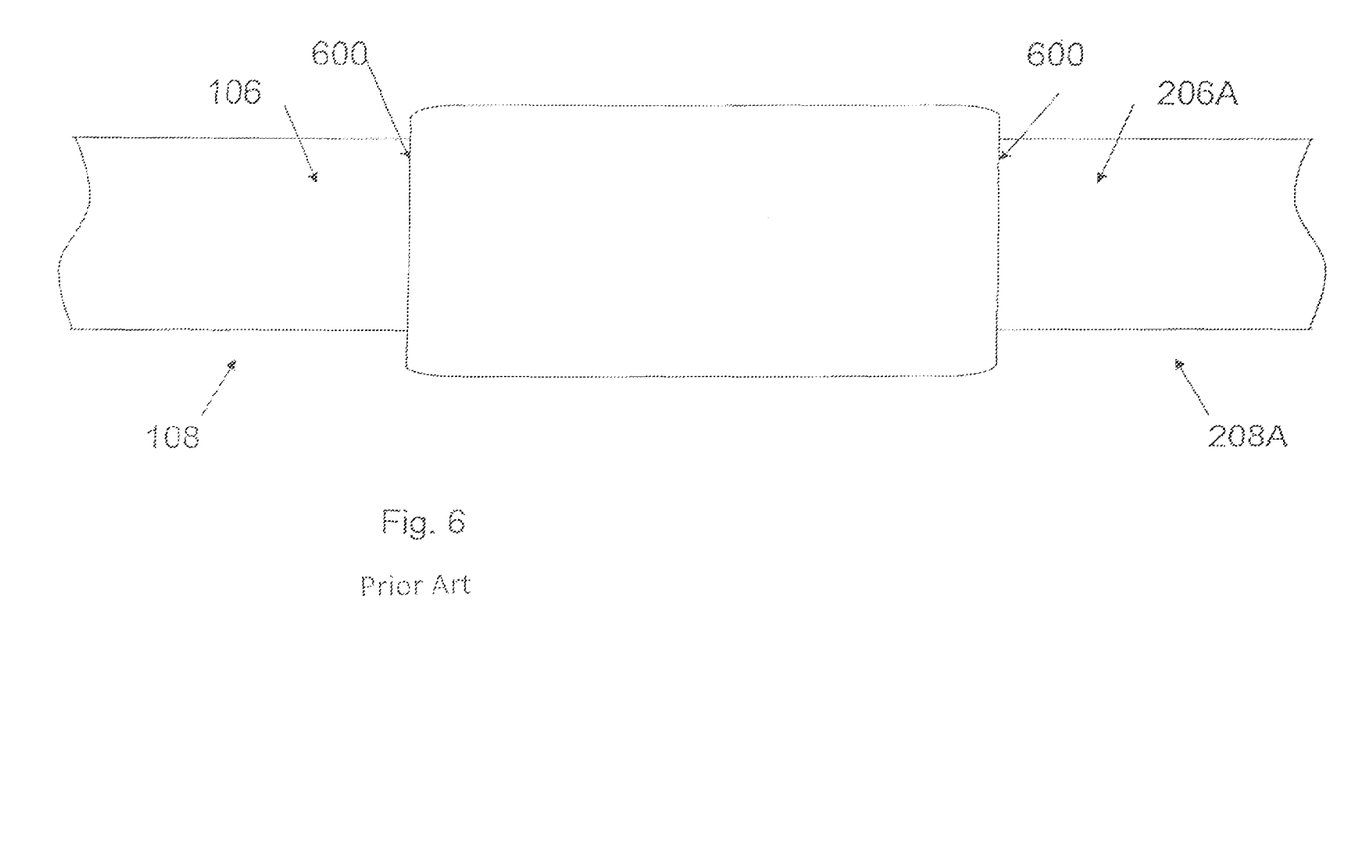
FIG. 6. show a prior art wire configuration after enclosed with a resulting seam.

Referring now to FIG. 6, as discussed above in the prior art, outer molding of polyethylene did not form a stable bond with the Teflon-based insulating layers; in essence, there is a transition seam 600 between the two materials, and the water will enter through that seam under sufficient pressure. In contrast, the fusion bond of the noted embodiment in FIG. 5A creates a homogenous polyethylene volume, which lacks any pathway for water to enter the mass 410 and reach assembly 300.

Preferably, the polyethylene in the outer jacket 206 and the injected polyethylene have similar densities to facilitate formation of the homogenous mixture. Medium density is preferred, although other densities could be used.

The shape of mold 400 is not critical. Preferably it encompasses the entire assembly 300 and at least some portion of the outer jacket 204, although this need not be the case and several smaller molds could be used to create the total seal. The mold must also have sufficient dimensions to provide a certain minimum thickness of polyethylene around the assembly 300. FIG. 4B shows the mold as substantially rectangular, with a length of approximately 1.6 inches, a width of 0.65 inches, and a height of 0.40 inches. Other dimensions could be used as appropriate. For an assembly of these dimensions, a mold cycle time of 34 minutes is preferable, but other time periods could be used. An appropriate, but non-limiting, first temperature is 295 degrees F., and the second temperature is 150 degrees F., with a rate of cooling of approximately 7 degrees per minute.

The bond formed during the molding operation will prevent water travel from reaching the over molded electronic element 302 or bare wires soldered to the PWB in the event of a wire breach. It will also prevent water from traveling through one over molded connection to the next over molded connection on the cable 208. Applicants are unaware of any other method that reliably provides this benefit while providing the continuous cover of polyethylene over the entire length of cable 208. (Although the water blocking does not work in the event that the inner conductors are damaged which, would result in a failed cable).

Figure 7:
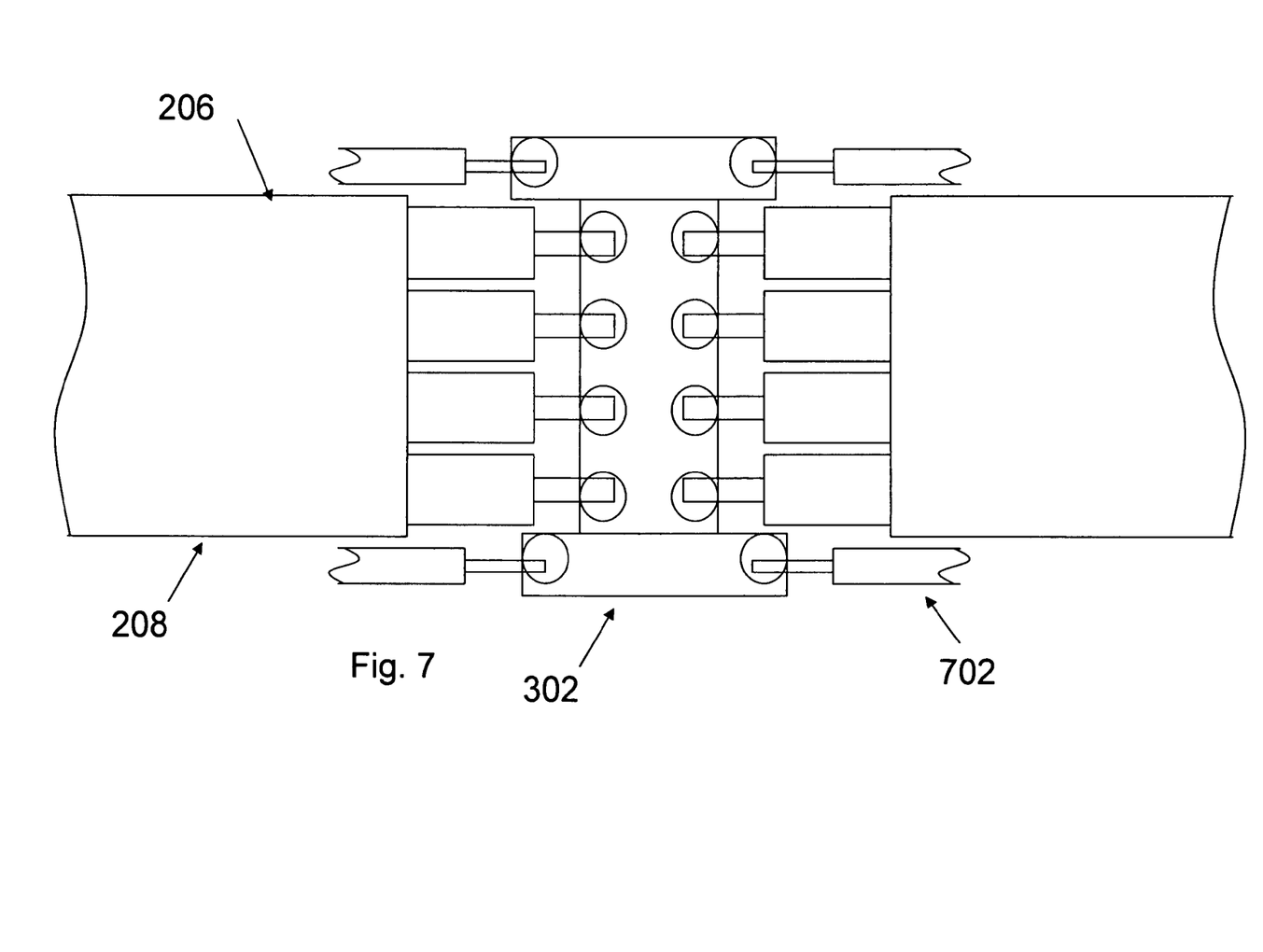
FIG. 7 shows several wires connecting an intermediate electronic element according to an embodiment of the invention.

Referring now to FIG. 7, sample cable was obtained from Mercury Wire and Cable, and manufactured with the cross-linked polyethylene insulation 204 to verify the function of the water block with representative wire. Each cable was approximately 0.260 inches in diameter, with an approximately 0.0201 inch diameter conductor 202 and insulating layer 204 approximately 0.048 inches in diameter. Three quarters of an inch of insulating layer 204 was exposed from the jacket 206. Approximately ⅛" to 3/16" of insulating layer 204 was removed at the end to expose the conductor 202 for soldering to the electronic element 302, in this case an I-shaped printed wiring board. Once stripped, the conductors were assembled to the interior portion of the printed wiring board with approx ½ inch of conductor insulation exposed.

Low Voltage Seal Lead wire was utilized to simulate a sensor lead wire 702 at the corners of the I shape. The insulation or coating of lead wire 202 was manufactured with the same material as jacket 206 (DHDB6549 NT). The insulating layer was removed, and the conductor was connected to electronic element 302. The leads were soldered with 63/37 flux cored solder (eutectic solder with a melt point of 361 F) and cleaned with isopropyl alcohol. The assembly was placed in a mold and the leads separated to ensure flow of injected poly around the cross-linked poly insulation. (The solid conductor stiffness prevents the movement during the molding operation.) The resulting shape is similar to that of FIG. 5A.

Twelve samples were tested. Six samples (group A) were tested shortly after the molding process. Six other samples were aged in water at 85 degrees C. for 5 days before testing.

Group A Testing

First Pressure cycle: Place a radial cut midway between the two over molds. Ensure insulation is exposed on the underlying conductors but not damaged.

10 cycles to 10,000 psi with 10 minute hold at extremes. (Ramp at 200 psi per minute).

Monitor IR between leads and between each lead and water on ramp up by testing momentarily to ensure no faults.

IR tests are to be conducted at 1000 volts.

Last cycle to 10,000 is to hold for at least 2 hours. Measure IR at 1000 volts for 5 minutes on last cycle at 10,000 and at 0 psi. Measure Lead to Lead (L to L) and Lead to Water (L to W)

Bend the quad wire at the point it exits the over mold. Bend the wire 5 cycles (Back and forth) then repeat 90 degrees for both quad wire interfaces.

Thermal cycle: Thermal cycle the samples −40 to +60 C with 30 minute holds at extremes. Cycle the samples 10 times.

Thermal Shock:

Place the samples one by one into 85 C water and allow to soak 10 minutes.

Remove and place into Ice water (Water and Ice mix, 0 to 0.1 C).

Allow to soak in the ice water for 10 minutes and remove. Place back in the 85 C water.

Repeat 10 times.

Second Pressure Cycle:

10 cycles to 10,000 with 10 minute hold at extremes. (Ramp at 200 psi per minute).

Last cycle to 10,000 is to hold for at least 2 hours.

Measure IR at 1000 volts for 5 minutes on last cycle at 10,000 and at 0 psi. Measure Lead to Lead (L to L) and Lead to Water (L to W).

Ramp to 10,000 psi and hold for 24 hours at pressure. Measure Lead to Lead (L to L) and Lead to Water (L to W) at end of 24 hour period.

Ramp to 0 psi (200 psi per minute) and hold for 24 hours. Measure Lead to Lead (L to L) and Lead to Water (L to W) at end of 24 hour period.

The results for the Group A samples (all L to L and L to W exceeded 50 Gigs at 1000 volts) were as follows:

| Sample | Pressure Test | Thermal cycle | Thermal Shock | Pressure Test |
|---|---|---|---|---|
| Group A Un-aged Wire | 0 to 10K, 10 minute holds, 10 Cycles (L to L, L to W) | (−40 to 60 C., 10 Cycles, L to L) | (0.1 to 85 C., 10 Cycles, L to L)) | 0 to 10K, 10 minute holds, 10 Cycles (L to L, L to W) |

-continued

| Sample | Pressure Test | Thermal cycle | Thermal Shock | Pressure Test |
|---|---|---|---|---|
| 1 & 2 | Jun. 30, 2007 > 50 Gig | Jul. 2, 2007 > 50 Gig | Jul. 2, 2007 > 50 Gig | Jul. 3, 2007 > 50 Gig |
| 3 & 4 | Jul. 2, 2007 > 50 Gig | Jul. 3, 2007 > 50 Gig | Jul. 3, 2007 > 50 Gig | Start Jul. 4, 2007 |
| 5 & 6 | Jul. 5, 2007 > 50 Gig | Jul. 6, 2007 > 50 Gig | Jul. 7, 2007 > 50 Gig | Jul. 8, 2007 > 50 Gig |

Group B Testing

Moisture Permeation Test (tests over molded polyethylene resistance to permeation of water vapor and its affect on PWB):

Take samples and place in thermal chamber configured for humidity.

Perform moisture test per Mil Std 883 method 1004 as a guide (Use profile in standard). Measure IR at 1000 volts L to L at extremes at least once and if only once on the last cycle.

Remove from test.

Place a radial cut mid way between all of the double over mold samples. Ensure insulation is exposed on the underlying conductors but not damaged.

First Pressure Cycle:

Place in water and age at 85 C for 5 days. Remove and Measure IR L to L

Thermal Cycle, Thermal Shock, and Second Pressure Cycle: Same tests as Group A above. The results for the Group B samples were as follows:

| Sample | Moisture Permeation Test | Pressure Test | Age in water (after molding) 5 days | Thermal cycle | Thermal Shock |
|---|---|---|---|---|---|
| Group B Aged Wire | Start Jul. 10, 2007 Complete Jul. 21, 2007 | 0 to 10K, 10 minute holds, 10 Cycles | | (−40 to 60 C., 10 Cycles) | (0.1 to 85 C., 10 Cycles) |
| 7 & 8 | 7/16 hot > 50 Gig | Jul. 23, 2007 > 50 Gig | >50 gig | >50 Gig | Aug. 4, 2007 > 50 Gig |
| 9 & 10 | 7/16 hot > 50 Gig | Jul. 23, 2007 > 50 Gig | one lead reads 16 gig 1 to 1 | Not Read | Shorts |
| 11 & 12 | 7/16 hot > 50 Gig | Jul. 26, 2007 > 50 Gig | >50 gig | Not Read | Shorts |

All three doubled-ended samples passed the Moisture Permeation test with IR Lead to Lead in excess of 50 Gigs at 1000 volts.

In an effort to save time and material, the samples for the moisture permeation test were carried into the second set of testing. (Test samples were subjected to further testing (Pressure Test, Aging in water for 5 days, thermal cycle, thermal shock and pressure testing)). As a result of the extensive heating cycles in conjunction with the pressure cycling, shorts were observed in two of the three sample sets. Further investigation located the shorts to the wire passing through the pressure test plugs.

The polyethylene over mold material was removed from one of the PWBs to observe the condition of the solder joints. The solder joints were noted to be bright and shiny. The condition of the solder joints as well as the electrical performance of all six samples (IR Lead to Lead in excess of 50 Gigs at 1000 volts (after removal of shorted area in pressure test plug)) indicates that the assembly 300 protects the printed wiring board sufficiently from exposure to water vapor.

As a result of the test results (shorts in samples 9, 10 and 11, 12 poly test plugs) for the group B samples, additional samples were assembled and testing repeated to gather additional information on the water block performance. The samples were tested per the same test procedure as previous sample numbers 1 through 12. The results are tabulated below.

| Sample | Moisture Permeation Test | Thermal cycle (Extra) | Thermal Shock (Extra) | Pressure Test (Extra) |
|---|---|---|---|---|
| Group B Aged Wire | Started Aug. 30, 2007 | (−40 to 60 C., 10 Cycles) | (0.1 to 85 C., 10 Cycles) | 0 to 10K, 10 minute holds, 10 Cycles |
| 13 & 14 | Sep. 11, 2007 one lead is 17 Gig | Sep. 13, 2007 one lead is 10 Gig | Sep. 15, 2007 one lead is 10 Gig | Oct. 7, 2007 L to L > 50 Gig |
| 15 & 16 | Sep. 11, 2007 L to L > 50 Gig | Sep. 13, 2007 L to L > 50 Gig | Sep. 15, 2007 one lead is 10 Gig | Oct. 7, 2007 L to L > 50 Gig |
| 17 & 18 | Sep. 11, 2007 L to L > 50 Gig | Sep. 13, 2007 L to L > 50 Gig | Sep. 15, 2007 one lead is 10 Gig | Sep. 30, 2007 L to L > 50 Gig |

| Sample | Pressure Test | Age in water (after molding) 5 days | Thermal cycle | Thermal Shock |
|---|---|---|---|---|
| Group B Aged Wire | 0 to 10K, 10 minute holds, 10 Cycles | | (−40 to 60 C., 10 Cycles) | (0.1 to 85 C., 10 Cycles) |
| 19 & 20 | Sep. 1, 2007 > 50 Gig | Sep. 11, 2007 L to L > 50 Gig | Sep. 13, 2007 L to L > 50 Gig | Sep. 15, 2007 L to L > 50 Gig |
| 21 & 22 | Sep. 2, 2007 > 50 Gig | Sep. 11, 2007 L to L > 50 Gig | Sep. 13, 2007 L to L > 50 Gig | Sep. 15, 2007 L to L > 50 Gig |
| 23 & 24 | Sep. 2, 2007 > 50 Gig | Sep. 11, 2007 L to L > 50 Gig | Sep. 13, 2007 L to L > 50 Gig | Sep. 15, 2007 L to L > 50 Gig |

Stress Crack/Material Compatibility Testing: To prevent bonding of the cross-linked poly insulated conductors during the extrusion process (Quad cable manufacturing), a slip agent was applied full strength to the conductors. This 5150CL manufactured by GEM (Mercury Wire part number is Slipper 1) was tested for stress cracking inducing to our insulation per ASTM 1693.

Samples of the bus wire (both jacketed and cross-linked insulated wire) were tested to ensure that the material was capable of meeting the environmental stress crack test. The test involves placing coils of the insulated wire (0.8 inch diameter) into a solution of Igepal at 10% strength. The coils and solution are heated at 50 C for 7 days. At the end of the 7 day period the coils are inspected for cracking which indicates the process/materials fail. The samples tested showed no sign of attack.

In addition, the slip agent (Mercury Wire part number Slipper 1, Gem Gravure part number 5150CL) used to prevent bonding of the cross-linked poly was tested to insure that it is not a stress cracking initiator to the poly jacketing material or cross-linked poly insulation. The material was tested as with the Igepal. At the end of the 7 day test no sign of attack was observed.

Summary of Tested Samples 12 molded sensor splice samples exposed to Moisture permeation test with IR in excess of 50 Gigs on all but one lead. One lead read 17 Gigs at 1000 volts DC.

24 molded sensor splice samples exposed to pressure cycling with L to L and L to W in excess of 50 Gigs at 10,000 psi and at 0 psi.

Wire jacketing material and cross-linked poly insulation exposed to environmental stress crack resistance testing (Igepal at 10% strength) with no degradation noted.

Wire jacketing material and cross-linked poly insulation exposed to Slipper 1 (100% strength) to ensure that the materials are compatible (non-stress cracking initiator) with no degradation noted.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A cable connection assembly, comprising:
   a plurality of insulated conductive wires;
   each individual wire of the plurality of conductive wires being covered by an insulating layer made of cross-linked polyethylene;
   an outer jacket of polyethylene surrounding the plurality of conductive wires;
   an electronic element electrically connected to exposed portions of the plurality of conductive wires; and
   an enclosure covering at least: the exposed portions of the plurality of conductive wires; adjacent portions of the outer jacket; and the electronic element;
   wherein the enclosure is a homogenous substance comprising polyethylene fusion bonded with the cross-linked polyethylene of the insulating layer; and
   wherein the enclosure is configured to prevent fluid from entering between the outer jacket and the plurality of insulated conductive wires if fluid is present under pressure.

2. The cable connection assembly of claim 1, further comprising
   an intermediate substance between the insulating layer of each one of the plurality of insulated conductive wires and the outer jacket.

3. The cable connection assembly of claim 2, wherein the intermediate substance is a nylon sheath or a spray-on slip agent.

4. The cable connection assembly of claim 1, wherein the degree of cross-linking within the cross-linked polyethylene is 50-90%.

5. The cable connection assembly of claim 1, wherein the degree of cross-linking within the cross-linked polyethylene is 60-70%.

6. The cable connection assembly of claim 1, wherein the electronic element comprises a printed wiring board.

* * * * *